(12) United States Patent
Miwa et al.

(10) Patent No.: US 10,358,009 B2
(45) Date of Patent: Jul. 23, 2019

(54) SUSPENSION DEVICE

(71) Applicants: KYB Corporation, Tokyo (JP); HONDA MOTOR CO., LTD., Tokyo (JP); Sumitomo Riko Company Limited, Aichi (JP)

(72) Inventors: Masahiro Miwa, Gifu (JP); Kazuma Ando, Gifu (JP); Yasutaka Ohta, Tochigi (JP)

(73) Assignees: KYB Corporation, Tokyo (JP); HONDA MOTOR CO., LTD., Tokyo (JP); SUMITOMO RIKO COMPANY LIMITED, Aichi (JP)

( * ) Notice: Subject to any disclaimer, the term of this patent is extended or adjusted under 35 U.S.C. 154(b) by 0 days.

(21) Appl. No.: 15/562,417

(22) PCT Filed: Mar. 30, 2016

(86) PCT No.: PCT/JP2016/060485
§ 371 (c)(1),
(2) Date: Sep. 27, 2017

(87) PCT Pub. No.: WO2016/159135
PCT Pub. Date: Oct. 6, 2016

(65) Prior Publication Data
US 2018/0105004 A1    Apr. 19, 2018

(30) Foreign Application Priority Data

Mar. 31, 2015 (JP) .................................. 2015-072944

(51) Int. Cl.
*B60G 11/16* (2006.01)
*B60G 15/06* (2006.01)
(Continued)

(52) U.S. Cl.
CPC .............. *B60G 11/16* (2013.01); *B60G 15/06* (2013.01); *B60G 15/063* (2013.01); *F16F 1/12* (2013.01);
(Continued)

(58) Field of Classification Search
CPC ..... B60G 15/062; B60G 11/16; F16F 9/3235; F16F 1/12
(Continued)

(56) References Cited

U.S. PATENT DOCUMENTS 3,051,469 A * 8/1962 Boschi ................... B60G 11/16
267/248
4,235,426 A * 11/1980 Sullivan, Jr. ........... B60G 11/52
188/322.12
(Continued)

FOREIGN PATENT DOCUMENTS

JP    2012-219825 A    11/2012
JP    2014-199134 A    10/2014

OTHER PUBLICATIONS

International Search Report in PCT/JP2016/060485, dated May 17, 2016, 4pp.

*Primary Examiner* — Christopher P Schwartz
(74) *Attorney, Agent, or Firm* — Hauptman Ham, LLP

(57) ABSTRACT

A rubber sheet includes: a main body fitted to a mounting portion formed so as to be depressed at the spring guide, the main body supporting a coil spring; and lips formed to project from respective side surfaces of an inner periphery and an outer periphery of the main body in a radial direction, the lips being configured to abut on the spring guide to prevent a foreign matter from invading between the main body and the mounting portion.

5 Claims, 6 Drawing Sheets

(51) Int. Cl.
*F16F 1/12* (2006.01)
*F16F 9/32* (2006.01)

(52) U.S. Cl.
CPC .......... *F16F 9/32* (2013.01); *B60G 2202/312* (2013.01); *B60G 2204/1242* (2013.01)

(58) Field of Classification Search
USPC ............ 267/220, 221; 280/124.164, 124.179
See application file for complete search history.

(56) References Cited

U.S. PATENT DOCUMENTS

| | | | |
|---|---|---|---|
| 6,398,201 B1* | 6/2002 | Solomond | B60G 15/063 267/170 |
| 2011/0291337 A1* | 12/2011 | Viault | B60G 15/068 267/220 |
| 2014/0265081 A1* | 9/2014 | Nakano | B60G 11/16 267/220 |

* cited by examiner

SUSPENSION DEVICE

RELATED APPLICATIONS

The present application is a National Phase of International Application No. PCT/JP2016/060485, filed Mar. 30, 2016, and claims priority based on Japanese Patent Application No. 2015-072944, filed Mar. 31, 2015.

TECHNICAL FIELD

The present invention relates to a rubber sheet and a suspension device.

BACKGROUND ART

JP2012-219825A discloses a suspension that includes a coil spring, a spring receiving member, and a spring rubber sheet. The coil spring is externally mounted on a shock absorber. The spring receiving member supports a lower end part of this coil spring and is fixed to a middle portion of the shock absorber. The spring rubber sheet is interposed between this spring receiving member and the lower end part of the coil spring.

At the suspension described in JP2012-219825A, a protrusion is formed at an inside part in a radial direction of the spring receiving member. Then, this protrusion has an upper end portion on which a deformation restricting portion formed at the spring rubber sheet abuts. This deformation restricting portion is formed at a position corresponding to an uppermost part of the coil spring lower end part that contacts a seating portion of the spring rubber sheet.

At the suspension described in JP2012-219825A, when the coil spring is in an extending state, since compression of the seating portion of the spring rubber sheet is released, a fitted portion of the spring rubber sheet to the coil spring recovers to an inside in the radial direction from a state curved outside in the radial direction. Thus, stress to curve and deform to the inside in the radial direction with respect to an initial position acts on the fitted portion by reactive force when the shape returns and friction force toward an upside of the coil spring. At this time, since the deformation restricting portion has a lower portion that abuts on a top end surface of the protrusion of the spring receiving member. Thus, the protrusion can support the stress that curves and deforms the fitted portion to the inside in the radial direction. Therefore, generation of a gap between the lower end portion of the coil spring and the outer side surface portion of the fitting portion is prevented, and entry of foreign matter such as mud and sand is prevented.

SUMMARY OF INVENTION

When the coil spring performs extension and contraction operation, the spring rubber sheet possibly deforms to generate the clearance between the spring receiving member and the spring rubber sheet. If the foreign matters such as dirt and sand invade this clearance, abnormal noise possibly occurs in accordance with the extension and contraction operation of the coil spring, or the spring receiving member and the spring rubber sheet are possibly damaged. The suspension described in JP2012-219825A can prevent the foreign matters such as dirt and sand from invading between a position corresponding to an uppermost part of the lower end part of the coil spring and the outer surface portion of the fitted portion of the spring rubber sheet. However, the suspension described in JP2012-219825A cannot prevent the foreign matter from invading between the spring receiving member and the spring rubber sheet.

The present invention has been made in view of such technical problem, and it is an object of the present invention to provide a rubber sheet and a suspension device that can prevent a foreign matter from invading between a spring guide and a rubber sheet.

According to a certain aspect of the present invention, the rubber sheet includes a main body and lips. The main body is fitted to a mounting portion formed so as to be depressed at the spring guide. The main body supports a coil spring. The lips are formed to project from respective side surfaces of an inner periphery and an outer periphery of the main body in a radial direction. The lips abut on the spring guide to prevent a foreign matter from invading between the main body and the mounting portion.

DESCRIPTION OF EMBODIMENTS

Figure 1:
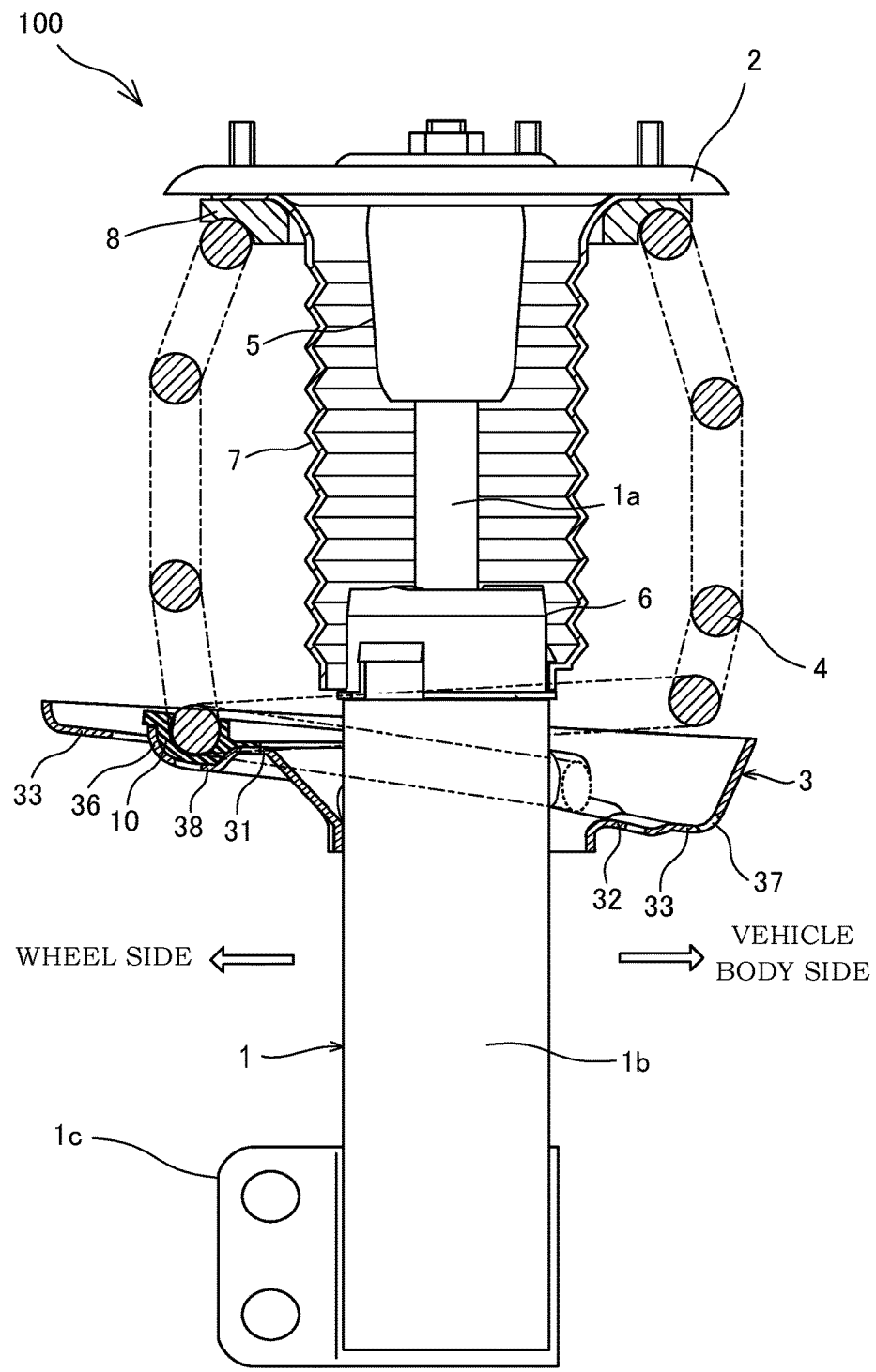
FIG. 1 is a partial cross-sectional view of a suspension device according to an embodiment of the present invention.
Figure 2:
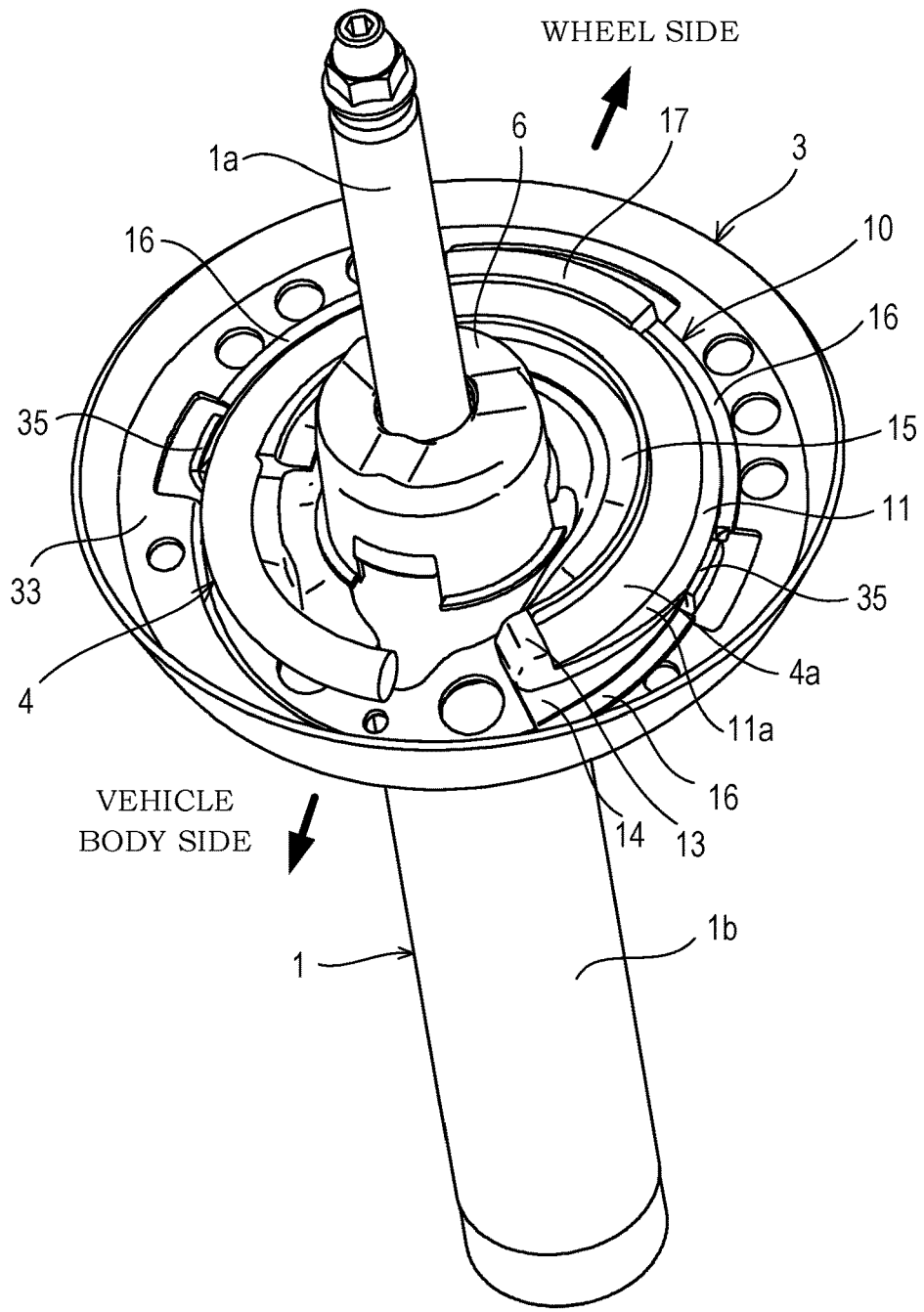
FIG. 2 is a partial perspective view of the suspension device according to the embodiment of the present invention.

The following describes a rubber sheet 10 and a suspension device 100 according to an embodiment of the present invention with reference to the attached drawings.

First, with reference to FIG. 1, the suspension device 100 in which the rubber sheet 10 according to the embodiment of the present invention is incorporated will be described.

The suspension device 100 is a device, which is mounted on an automobile (not illustrated), that positions a wheel (not illustrated) and generates damping force to absorb impact and vibration received from a road surface during the vehicle running and stably suspends the vehicle body.

The suspension device 100 includes a strut-type shock absorber 1, an upper mount 2, a spring guide 3, a coil spring 4, a bump stopper 5, a bump cap 6, and a dust boot 7. The shock absorber 1 is disposed between the vehicle body and the wheel. The upper mount 2 is mounted on a distal end of a piston rod 1a of the shock absorber 1. The spring guide 3 is mounted on an outer peripheral surface of a cylinder 1b of the shock absorber 1. The coil spring 4 is disposed between the spring guide 3 and the upper mount 2. The bump stopper 5 is fitted into the piston rod 1a to restrict stroke at a shrinkage side of the shock absorber 1. The bump cap 6 is a capping member fitted into an end portion at the piston rod 1*a* side of the cylinder 1*b*. The dust boot 7 is a pipe-shaped cover member that protects the piston rod 1*a*.

The cylinder 1*b* has an end portion at the opposite side of the piston rod 1*a*. At this end portion of the cylinder 1*b*, a bracket 1*c* for coupling a hub carrier (not illustrated) that holds the wheel to the shock absorber 1 is disposed. The shock absorber 1 is coupled to the vehicle body by the upper mount 2 and is coupled to the hub carrier by the bracket 1*c* to be assembled on the vehicle. The shock absorber 1 configured as described above is configured to generate the damping force when the piston rod 1*a* moves in an axial direction (the vertical direction in FIG. 1) with respect to the cylinder 1*b*. The suspension device 100 quickly damps the vibration of the vehicle body by this damping force of the shock absorber 1.

The coil spring 4 is sandwiched between the upper mount 2 and the spring guide 3 in a compressed state to bias the shock absorber 1 in an extending direction. Between the upper mount 2 and the coil spring 4, an upper-side rubber sheet 8 is disposed. This keeps the upper mount 2 from not directly abutting on the coil spring 4. Between the spring guide 3 and the coil spring 4, the arc-shaped rubber sheet 10 is disposed. This keeps the spring guide 3 from not directly abutting on the coil spring 4.

The following describes the spring guide 3 with reference to FIG. 1 to FIG. 4.

The spring guide 3 is a metallic dish-shaped member fixed to an outer periphery of the cylinder 1*b* for supporting the coil spring 4. The spring guide 3 includes an opening 30, a protrusion 31, an annular-shaped mounting portion 32, an annular-shaped outer circumference 33, and an annular-shaped support wall 34. The opening 30 is for inserting the cylinder 1*b*. The protrusion 31 is formed to project to the upper mount 2 side so as to surround the opening 30. The mounting portion 32 is formed to surround the protrusion 31 to have an arc groove 38 to which the rubber sheet 10 is fitted. The outer circumference 33 is formed at an outside in a radial direction of the mounting portion 32. The support wall 34 extends from the outer circumference 33 to the upper mount 2 side to be formed to surround the outer circumference 33.

Figure 4:
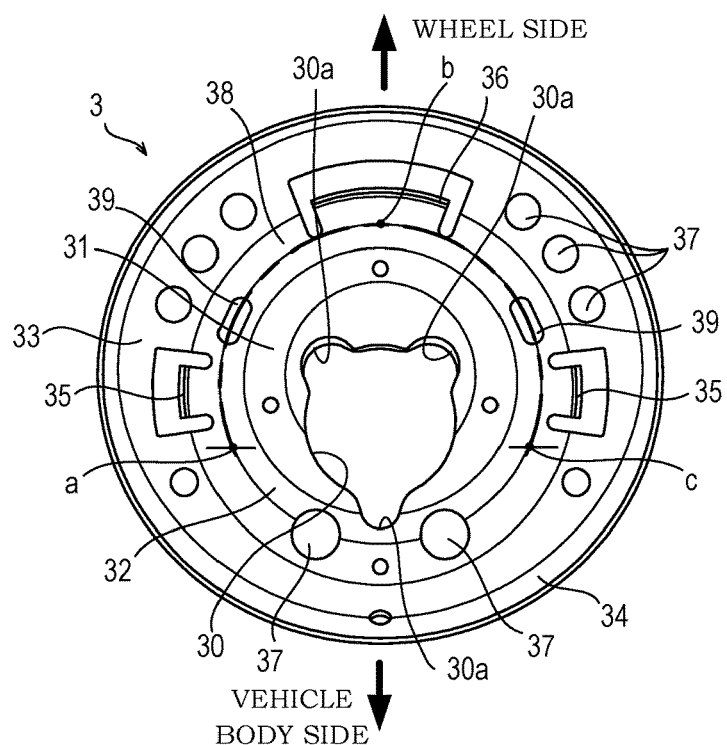
FIG. 4 is a plan view of the spring guide according to the embodiment of the present invention.

As illustrated in FIG. 1 and FIG. 4, when the spring guide 3 is fixed to the outer periphery of the cylinder 1*b*, the opening 30 is formed to be at a position eccentrically to the vehicle body side from the center of the spring guide 3. The spring guide 3 is fixed to the outer periphery of the cylinder 1*b* by welding the opening 30 to the outer periphery of the cylinder 1*b*. At the opening 30, a plurality of cutouts 30*a* are disposed. The cutout 30*a* functions as a drainage when water or the like is accumulated in the spring guide 3.

Figure 3:
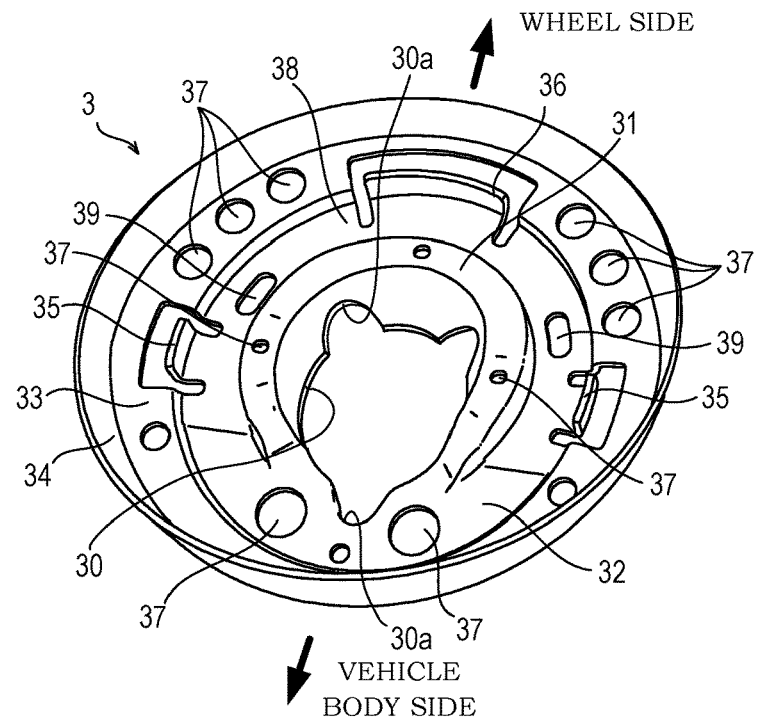
FIG. 3 is a perspective view of a spring guide according to the embodiment of the present invention.

As illustrated in FIG. 1 and FIG. 3, the protrusion 31 is formed to project to the upper mount 2 side (the upper side in FIG. 1). The protrusion 31 is formed into an arc shape such that both end portions in a circumferential direction are positioned to the vehicle body side, when the spring guide 3 is mounted on the outer periphery of the cylinder 1*b*.

Figure 5:
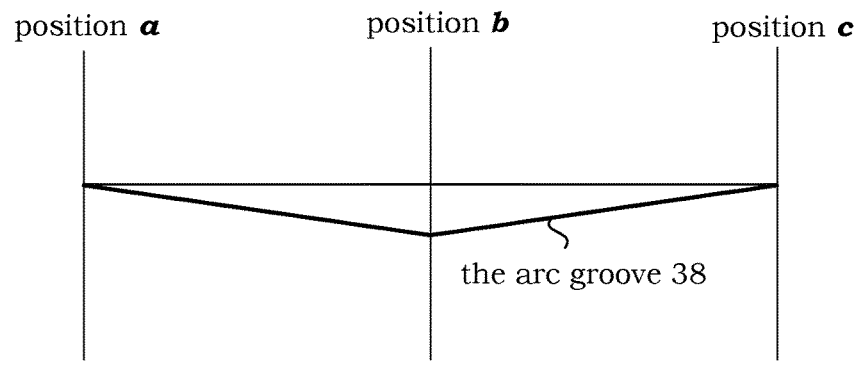
FIG. 5 is a view illustrating a change of a depth of a seat surface of the spring guide according to the embodiment of the present invention.

The mounting portion 32 is formed into an annular shape so as to be depressed with respect to the outer circumference 33. The mounting portion 32 has the arc groove 38 to which the rubber sheet 10 is fitted. The arc groove 38 is formed as an arc-shaped groove between the protrusion 31 and the outer circumference 33. As illustrated in FIG. 4 and FIG. 5, the arc groove 38 is formed such that a depth of the groove is deepest near the arc center (position b) positioned at the wheel side, and the depth of the groove shallows toward the vehicle body side, that is, both end portions (position a and position c) in the circumferential direction of the arc.

At the arc groove 38, a plurality of engaging holes 39 are formed. With the engaging holes 39, protrusions (not illustrated) formed on a bottom surface of the rubber sheet 10 are engaged. This engagement of the protrusions of the rubber sheet 10 with the engaging holes 39 prevents displacement of the rubber sheet 10 against the spring guide 3.

The arc groove 38 further includes two first lock pieces 35 and a second lock piece 36 that are formed by standing at the outer periphery. Each of the two first lock pieces 35 is formed at a position opposed to a vicinity of an end portion in a circumferential direction of the rubber sheet 10, in a state where the arc-shaped rubber sheet 10 is fitted to the arc groove 38. The second lock piece 36 is formed at a position opposed to a vicinity of a center portion in the circumferential direction of the rubber sheet 10, in the state where the arc-shaped rubber sheet 10 is fitted to the arc groove 38. Thus, in the state where the rubber sheet 10 is fitted to the arc groove 38, even if load to the outside in the radial direction acts on the rubber sheet 10 in accordance with extension and contraction of the coil spring 4, the outer periphery of the rubber sheet 10 abuts on the first lock pieces 35 and the second lock piece 36. Thus, movement to the outside in the radial direction is restricted. Accordingly, the first lock pieces 35 and the second lock piece 36 prevent the displacement to the outside in the radial direction of the rubber sheet 10.

At the protrusion 31, the mounting portion 32, and the outer circumference 33, a plurality of through-holes 37 are formed. The through-hole 37 functions as a punched portion for weight reduction, and functions as a drain hole when water or the like is accumulated in the spring guide 3.

The following describes the rubber sheet 10 with reference to FIG. 2, and FIG. 6 to FIG. 10.

The rubber sheet 10 is made of a material having elasticity such as rubber. The rubber sheet 10 includes a main body 11, an arc-shaped seating portion 12, a stopper portion 13, and a deformation restricting portion 14. The main body 11 is formed into an arc shape to be fitted to the arc groove 38 of the spring guide 3. The seating portion 12 is formed into a groove shape at the main body 11. The coil spring 4 is seated on the seating portion 12. The stopper portion 13 is formed at one end portion in the circumferential direction of the main body 11, and abuts on an end surface of a terminal portion 4*a* of the coil spring 4 to restrict movement of the coil spring 4. The deformation restricting portion 14 is formed to project outside in the radial direction from the outer periphery of the main body 11 at an end portion 11*a* of the main body 11. The end portion 11*a* supports the terminal portion 4*a* of the coil spring 4.

Figure 9:
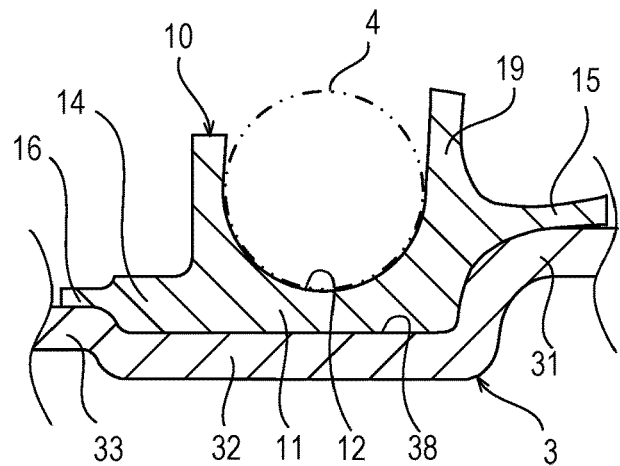
FIG. 9 is a partial cross-sectional view taken along the line I-I in FIG. 8.

As illustrated in FIG. 9, the seating portion 12 is formed such that its cross-sectional surface curves along a cross-sectional shape of the coil spring 4.

At the rubber sheet 10, the main body 11 is fitted to the arc groove 38 of the spring guide 3 at a part at which the deformation restricting portion 14 is not formed, and the main body 11 and the deformation restricting portion 14 are fitted to the arc groove 38 of the spring guide 3 at a part at which the deformation restricting portion 14 is formed. In a state where the rubber sheet 10 is fitted to the arc groove 38 of the spring guide 3, the main body 11 and the deformation restricting portion 14 of the rubber sheet 10 abut on a bottom surface of the arc groove 38. It should be noted that the rubber sheet 10 may have a shape where only the main body 11 is fitted to the arc groove 38 and the deformation restricting portion 14 is abutted on the outer circumference 33 without being fitted to the arc groove 38.

The rubber sheet 10 further includes an inner-peripheral-side lip 15 and an outer-peripheral-side lip 16 at an inner periphery and the outer periphery. The inner-peripheral-side lip 15 is formed to project inside in the radial direction from a side surface at the inner peripheral side of the main body 11. The outer-peripheral-side lip 16 is formed to project from a side surface at the outer peripheral side of the main body 11 and an outer periphery of the deformation restricting portion 14. The inner-peripheral-side lip 15 is disposed throughout the whole circumference at the inner peripheral side of the main body 11. It should be noted that, when the first and second lock pieces 35, 36 are not disposed at the spring guide 3, the outer-peripheral-side lip 16 is disposed throughout the whole circumference at the outer peripheral side of the main body 11. In the state where the rubber sheet 10 is fitted to the arc groove 38 of the spring guide 3, the inner-peripheral-side lip 15 abuts on the protrusion 31 so as to cover the protrusion 31 from above, and the outer-peripheral-side lip 16 abuts on the outer circumference 33 so as to cover the outer circumference 33 from above (see FIG. 9). Thus, even if the coil spring 4 extends and contracts to create a clearance between the main body 11 of the rubber sheet 10 and the arc groove 38 of the spring guide 3, the inner-peripheral-side lip 15 and the outer-peripheral-side lip 16 have abutted on the protrusion 31 and the outer circumference 33 of the spring guide 3 so as to cover the protrusion 31 and the outer circumference 33 from above respectively. This can prevent a foreign matter or the like from invading between the main body 11 of the rubber sheet 10 and the arc groove 38 of the spring guide 3. It should be noted that, by forming the inner-peripheral-side lip 15 and the outer-peripheral-side lip 16 inclined to the protrusion 31 and the outer circumference 33 sides, the inner-peripheral-side lip 15 and the outer-peripheral-side lip 16 are pressed to and abutted on the protrusion 31 and the outer circumference 33. Thus, even if the main body 11 of the rubber sheet 10 deforms, the clearance is less likely to occur between the inner-peripheral-side lip 15 and the protrusion 31, and between the outer-peripheral-side lip 16 and the outer circumference 33. Accordingly, this can further prevent the foreign matter or the like from invading between the main body 11 of the rubber sheet 10 and the arc groove 38 of the spring guide 3.

Figure 10:
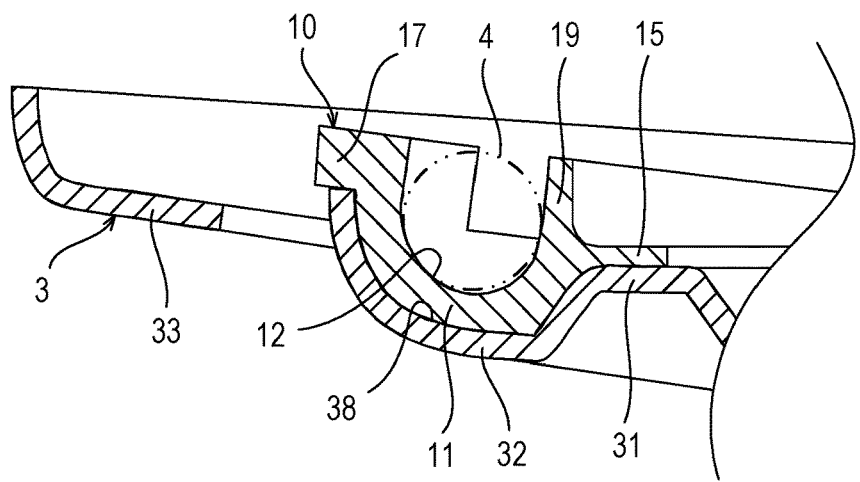
FIG. 10 is a partial cross-sectional view taken along the line II-II in FIG. 8

As illustrated in FIG. 9 and FIG. 10, the rubber sheet 10 further includes a rising portion 19 disposed upright on the inner peripheral side of the main body 11. The rising portion 19 is formed as standing upright from a portion at which the inner-peripheral-side lip 15 of the main body 11 is disposed toward the upper mount 2 side. The rising portion 19 is disposed throughout the whole circumference at the inner periphery of the main body 11.

Figure 6:
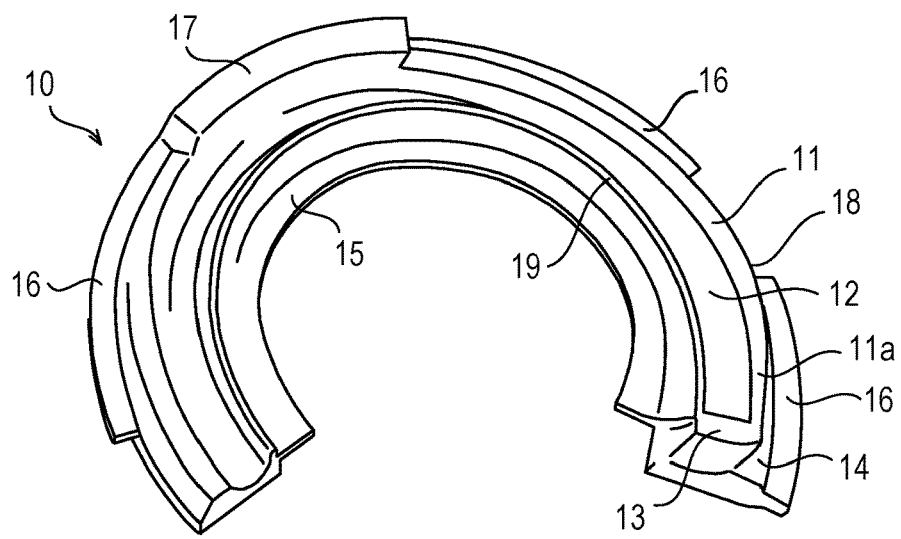
FIG. 6 is a perspective view of a rubber sheet according to the embodiment of the present invention.
Figure 7:
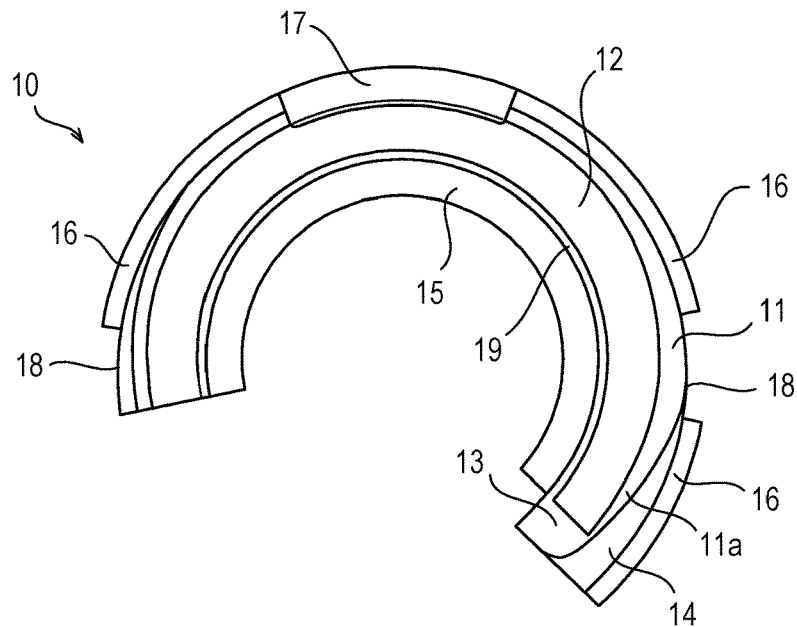
FIG. 7 is a plan view of the rubber sheet according to the embodiment of the present invention.
Figure 8:
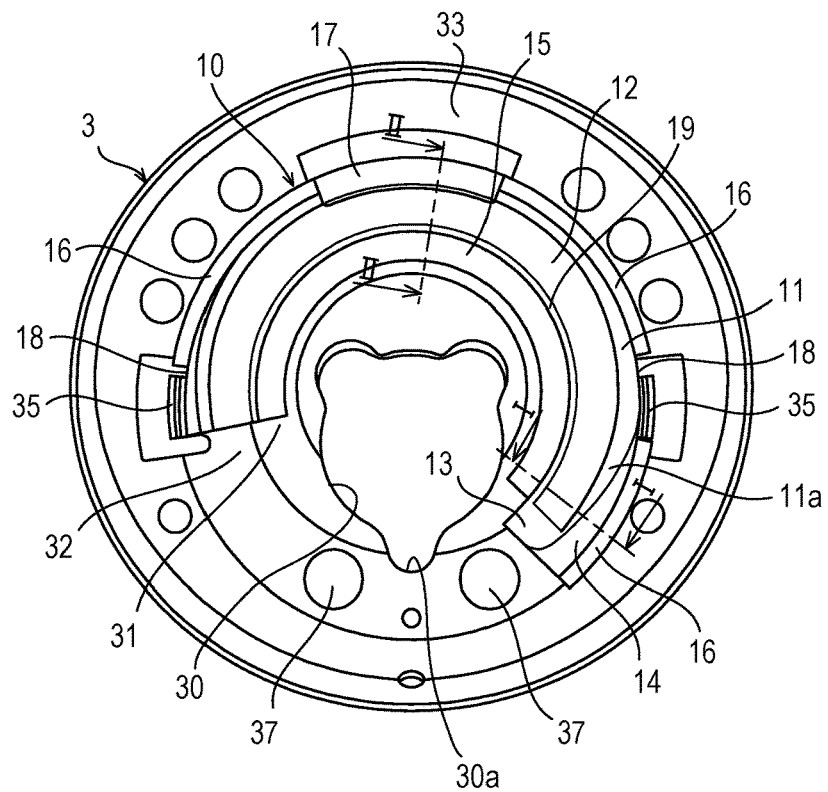
FIG. 8 is a view illustrating a state where the rubber sheet has been mounted on the spring guide according to the embodiment of the present invention.

As illustrated in FIG. 6 to FIG. 8, at the outer-peripheral-side lip 16, cutouts 18 are formed at positions opposed to the first lock pieces 35 of the spring guide 3. At the outer-peripheral-side lip 16, a covering portion 17 as covering the second lock piece 36 is formed integrally with the outer-peripheral-side lip 16 at a position opposed to the second lock piece 36 of the spring guide 3. Disposing the covering portion 17 can prevent the foreign matter or the like from invading between the main body 11 of the rubber sheet 10 and the arc groove 38 of the spring guide 3 through the second lock piece 36. It should be noted that, instead of the cutouts 18, covering portions as covering the first lock pieces 35 may be disposed at the positions opposed to the first lock pieces 35 of the outer-peripheral-side lip 16.

The rubber sheet 10 is positioned with respect to the spring guide 3 such that protrusions (not illustrated) formed on a surface abutting on the arc groove 38 are engaged with the engaging holes 39 of the spring guide 3, and the cutouts 18 and the covering portion 17 are engaged with the first lock pieces 35 and the second lock piece 36 of the spring guide 3 respectively. Then, the rubber sheet 10 is fitted to the arc groove 38.

Typically, at the suspension device, large load acts on the wheel side compare with the vehicle body side. If the terminal portion 4a of the coil spring 4 is arranged at a position that receives such large load, large load locally acts on the end portion 11a of the rubber sheet 10 that supports the terminal portion 4a of the coil spring 4, and the spring guide 3. In view of this, at the suspension device 100, the terminal portion 4a is arranged at a position apart from the wheel side (inside the vehicle body) (see FIG. 2) such that a part other than the terminal portion 4a of the coil spring 4 receives the large load as described above. By arranging the coil spring 4 as described above, the large load can be received at a long area (the part other than the terminal portion 4a) of a wire rod in the coil spring 4 at the wheel side. Since a large load is not locally acted on the rubber sheet 10 and the spring guide 3, it is possible to prevent the rubber sheet 10 and the spring guide 3 from being damaged. Furthermore, at the terminal portion 4a, the load that acts on the end portion 11a of the rubber sheet 10 via the terminal portion 4a of the coil spring 4 is reduced. Thus, the end portion 11a of the rubber sheet 10 becomes less likely to deform.

The following describes an action of the deformation restricting portion 14 of the rubber sheet 10.

When the wheel vibrates in a vertical direction, for example, by unevenness of the road surface during the vehicle running, the shock absorber 1 and the coil spring 4 of the suspension device 100 extend and contract in accordance with vertical motion of the wheel. When the coil spring 4 contracts, large load acts on the terminal portion 4a of the coil spring 4 toward the outside in the radial direction. If the large load acts on the terminal portion 4a of the coil spring 4, stress to deform the rubber sheet 10 as twisting toward the outside in the radial direction acts on the end portion 11a of the rubber sheet 10. The deformation restricting portion 14 is formed to project outside in the radial direction from the outer periphery of the main body 11 to abut on the arc groove 38 of the spring guide 3. Thus, the deformation restricting portion 14 restricts the deformation of the rubber sheet 10 as twisting toward the outside in the radial direction, against the load from the coil spring 4.

If the load in the radial direction acts on the rubber sheet 10 in accordance with the extension and contraction of the coil spring 4, friction resistance occurs between the main body 11 of the rubber sheet 10 and the arc groove 38 of the spring guide 3. Furthermore, since the deformation restricting portion 14 of the rubber sheet 10 abuts on the arc groove 38 of the spring guide 3, in addition to the friction resistance between the main body 11 of the rubber sheet 10 and the arc groove 38 of the spring guide 3, friction resistance will also occur between the deformation restricting portion 14 and the arc groove 38. Accordingly, even if the load in the radial direction acts on the rubber sheet 10, displacement of the rubber sheet 10 on the spring guide 3 can be further prevented.

The spring guide 3 is, as described above, formed such that the opening 30 is positioned eccentrically to the vehicle body side from the center of the spring guide 3. As illustrated in FIG. 1, the spring guide 3 is mounted such that the vehicle body side is lowered compared with the wheel side. Thus, it is necessary to dispose the cutout 30a for drain at the vehicle body side. In view of this, at the spring guide 3, it is difficult to ensure a width in the radial direction at the vehicle body side at the mounting portion 32. Thus, it is not easy to deepen the depth at the vehicle body side of the arc groove 38. As described above, the terminal portion 4a of the coil spring 4 is arranged at the vehicle body side (inside the vehicle body). Thus, in the state where the rubber sheet 10 is fitted to the arc groove 38, the end portion 11a in the circumferential direction of the rubber sheet 10 that supports the terminal portion 4a of the coil spring 4 will be positioned near an end portion (position c in FIG. 4) at which the groove depth of the arc groove 38 of the spring guide 3 is shallow. Thus, when the end portion 11a of the rubber sheet 10 is positioned at the position at which the depth of the arc groove 38 is shallow, a sidewall of the arc groove 38 cannot support the end portion 11a of the rubber sheet 10. Accordingly, the end portion 11a becomes likely to deform as twisting toward the outside in the radial direction. However, the rubber sheet 10 restricts the deformation of the rubber sheet 10 as twisting to the outside in the radial direction against the load from the coil spring 4, since, as described above, the deformation restricting portion 14 is formed to project outside in the radial direction from the outer periphery of the main body 11 to abut on the arc groove 38 of the spring guide 3.

In such configuration, when the end portion of the rubber sheet 10 receives the load from the terminal portion 4a of the coil spring 4, the end portion of the rubber sheet 10 becomes likely to be removed from the arc groove 38. However, as described above, the deformation restricting portion 14 of the rubber sheet 10 abuts on the arc groove 38 of the spring guide 3, and the friction resistance occurs between them. This can prevent the end portion 11a of the rubber sheet 10 from being displaced to be removed from the arc groove 38.

The following describes an action of the rising portion 19 of the rubber sheet 10.

When the wheel vibrates in the vertical direction, for example, by unevenness of the road surface during the vehicle running, the shock absorber 1 and the coil spring 4 of the suspension device 100 extend and contract in accordance with vertical motion of the wheel. At this time, the coil spring 4 attempts to slide in the radial direction so as to escape to a direction on which the load does not act. At this time, the lower end portion of the coil spring 4 is seated on the seating portion 12 of the rubber sheet 10. Thus, the displacement in the radial direction of the coil spring 4 is restricted by the protrusion 31 of the spring guide 3 via the main body 11. However, when the depth of the arc groove 38 is not sufficiently ensured, in other words, when a height of the protrusion 31 is not sufficiently ensured, the protrusion 31 cannot restrict the displacement in the radial direction of the coil spring 4. In view of this, the rubber sheet 10, as described above, includes the rising portion 19 disposed upright on the inner peripheral side of the main body 11. Thus, even when the height of the protrusion 31 is not sufficiently ensured, the rising portion 19 supports the inner periphery of the coil spring 4 to ensure the restriction of the displacement in the radial direction of the coil spring 4.

According to the above-described embodiment, the following described effect is provided.

The rubber sheet 10 includes the inner-peripheral-side lip 15 and the outer-peripheral-side lip 16 formed to project from the respective side surfaces of the inner periphery and the outer periphery of the main body 11 in the radial direction to abut on the spring guide 3. Thus, in the state where the rubber sheet 10 is fitted to the arc groove 38 of the spring guide 3, the inner-peripheral-side lip 15 abuts on the protrusion 31 so as to cover the protrusion 31 from above, and the outer-peripheral-side lip 16 abuts on the outer circumference 33 so as to cover the outer circumference 33 from above. Accordingly, even if the coil spring 4 extends and contracts to generate the clearance between the main body 11 of the rubber sheet 10 and the arc groove 38 of the spring guide 3, the inner-peripheral-side lip 15 and the outer-peripheral-side lip 16 have abutted on the protrusion 31 and the outer circumference 33 of the spring guide 3 so as to cover the protrusion 31 and the outer circumference 33 from above respectively. This can prevent the foreign matter or the like from invading between the main body 11 of the rubber sheet 10 and the arc groove 38 of the spring guide 3.

The rubber sheet 10 further includes the rising portion 19 disposed upright on the inner peripheral side of the main body 11. Thus, even when the height of the protrusion 31 is not sufficiently ensured, the rising portion 19 supports the inner periphery of the coil spring 4 to ensure the restriction of the displacement in the radial direction of the coil spring 4.

The following describes the configuration, the action, and the effect according to the embodiment of the present invention as a whole.

The rubber sheet 10 is disposed between the coil spring 4 and the spring guide 3. The coil spring 4 elastically supports the vehicle body. The spring guide 3 supports the lower end portion of the coil spring 4. The rubber sheet 10 is formed into the arc shape or the annular shape. The rubber sheet 10 includes the main body 11 and the lips (the inner-peripheral-side lip 15 and the outer-peripheral-side lip 16). The spring guide 3 has the mounting portion 32 in a form of a depression. The main body 11 is fitted to the mounting portion 32 to support the coil spring 4. The lips (the inner-peripheral-side lip 15 and the outer-peripheral-side lip 16) are formed to project from the respective side surfaces of the inner periphery and the outer periphery of the main body 11 in the radial direction. The lips (the inner-peripheral-side lip 15 and the outer-peripheral-side lip 16) abut on the spring guide 3 to prevent the foreign matter from invading between the main body 11 and the mounting portion 32.

In this configuration, the lips (the inner-peripheral-side lip 15 and the outer-peripheral-side lip 16) formed to project from the respective side surfaces of the inner periphery and the outer periphery of the main body 11 in the radial direction abut on the spring guide. This can prevent the foreign matter from invading between the spring guide and the rubber sheet.

The lips (the inner-peripheral-side lip 15 and the outer-peripheral-side lip 16) are disposed throughout the whole circumference of at least one of the inner periphery and the outer periphery of the main body 11.

In this configuration, at at least one of the inner periphery and the outer periphery of the main body 11, since the lips (the inner-peripheral-side lip 15 and the outer-peripheral-side lip 16) are disposed throughout the whole circumference, the invasion of the foreign matter can be further prevented.

The rubber sheet 10 includes the rising portion 19 disposed upright on the inner peripheral side of the main body 11 to support the inner periphery of the coil spring 4.

In this configuration, since the rising portion 19 supports the inner periphery of the coil spring 4, the displacement in the radial direction of the coil spring 4 can be restricted.

The suspension device 100 includes the rubber sheet 10, the shock absorber 1 disposed between the vehicle body and the wheel, the upper mount 2 mounted on the distal end of the rod (the piston rod 1a) of the shock absorber 1, the spring guide 3 mounted on the outer peripheral surface of the shock absorber 1, and the coil spring 4 disposed between the upper mount 2 and the spring guide 3.

In this configuration, the rubber sheet 10 is applicable to the suspension device 100.

Embodiments of this invention were described above, but the above embodiments are merely examples of applications of this invention, and the technical scope of this invention is not limited to the specific constitutions of the above embodiments.

For example, the rubber sheet 10 may have an annular shape. The inner-peripheral-side lip 15 and the outer-peripheral-side lip 16 may be disposed only at positions where the clearance is likely to occur. Furthermore, the deformation restricting portion 14 may have a certain clearance with the arc groove 38 insofar as the deformation restricting portion 14 can abut on the arc groove 38. In this case, the deformation of the rubber sheet 10 will be allowed to some extent. Furthermore, the arc groove 38 (the mounting portion 32) may be constituted as an annular-shaped groove. For example, a stiffener may be buried at the deformation restricting portion 14.

This application claims priority based on Japanese Patent Application No. 2015-72944 filed with the Japan Patent Office on Mar. 31, 2015, the entire contents of which are incorporated into this specification.

The invention claimed is:

1. A suspension device, comprising:
    a shock absorber configured to be disposed between a vehicle body and a wheel;
    an upper mount mounted on a distal end of a rod of the shock absorber;
    a spring guide mounted on an outer peripheral surface of the shock absorber;
    a coil spring disposed between the spring guide and the upper mount for elastically supporting the vehicle body; and
    a rubber sheet disposed between the coil spring and the spring guide, the rubber sheet has an arc shape or an annular shape, wherein
    the rubber sheet includes:
        a main body fitted to a mounting portion of the spring guide to support the coil spring, the mounting portion having an annular shape; and
        lips projecting from respective side surfaces of an inner periphery and an outer periphery of the main body in a radial direction, wherein the lips abut on the spring guide to prevent foreign matter from invading between the main body and the mounting portion,
    the spring guide includes:
        a protrusion projecting toward the upper mount; and
        an outer circumference having an annular-shape and arranged at an outside of the mounting portion in the radial direction,
    the lips include:
        an inner-peripheral-side lip projecting inwardly in the radial direction from a side surface at an inner peripheral side of the main body; and
        an outer-peripheral-side lip projecting outwardly in the radial direction from a side surface at an outer peripheral side of the main body, and
    during extension and contraction of the coil spring, the inner-peripheral-side lip and the outer-peripheral-side lip are kept abutted on the protrusion and the outer circumference of the spring guide, respectively, from above.

2. The suspension device according to claim 1, wherein the lips are disposed throughout a whole circumference of at least one of the inner periphery and the outer periphery of the main body.

3. The suspension device according to claim 1, wherein the rubber sheet further comprises
    a rising portion disposed on the inner peripheral side of the main body and projecting toward the upper mount to support an inner periphery of the coil spring.

4. The suspension device according to claim 1, wherein a bottom surface of the main body of the rubber sheet abuts on the mounting portion of the spring guide over an entire surface of the bottom surface of the main body of the rubber sheet.

5. The suspension device according to claim 1, wherein the inner-peripheral-side lip and the outer-peripheral-side lip are formed so as to be inclined to the protrusion and the outer circumference sides, respectively.

* * * * *